(12) United States Patent
Mazzer

(10) Patent No.: US 10,918,245 B2
(45) Date of Patent: Feb. 16, 2021

(54) COFFEE GRINDER-DOSER WITH REPOSITIONABLE SYSTEM FOR INDICATING THE POSITION OF THE MEANS FOR ADJUSTING THE DISTANCE BETWEEN THE GRINDERS

(71) Applicant: MAZZER LUIGI S.p.A., Venice (IT)

(72) Inventor: Giovanni Mazzer, Venice (IT)

(73) Assignee: MAZZER LUIGI S.p.A., Venice (IT)

(\*) Notice: Subject to any disclaimer, the term of this patent is extended or adjusted under 35 U.S.C. 154(b) by 203 days.

(21) Appl. No.: 16/163,870

(22) Filed: Oct. 18, 2018

(65) Prior Publication Data

US 2019/0117020 A1 Apr. 25, 2019

(30) Foreign Application Priority Data

Oct. 19, 2017 (IT) .................. 102017000118492

(51) Int. Cl.
*A47J 42/08* (2006.01)
*A47J 42/34* (2006.01)
(Continued)

(52) U.S. Cl.
CPC ............. *A47J 42/08* (2013.01); *A47J 42/06* (2013.01); *A47J 42/10* (2013.01); *A47J 42/24* (2013.01); *A47J 42/34* (2013.01)

(58) Field of Classification Search
CPC .. A47J 42/08; A47J 42/06; A47J 42/10; A47J 42/50
See application file for complete search history.

(56) References Cited

U.S. PATENT DOCUMENTS

| 4,037,798 A | 7/1977 | Schnitzer |
| 6,827,002 B1 \* | 12/2004 | Lin .................. A47J 31/42 |
| | | 241/100 |

(Continued)

FOREIGN PATENT DOCUMENTS

| DE | 24 47 380 A1 | 4/1976 |
| DE | 20 2009 009 496 U1 | 11/2009 |

(Continued)

OTHER PUBLICATIONS

Italian Search Report for corresponding Italian Patent Application No. 102017000118492 dated Jun. 11, 2018, 7 pages.

*Primary Examiner* — Faye Francis
(74) *Attorney, Agent, or Firm* — Merchant & Gould P.C.

(57) ABSTRACT

A coffee grinder-doser includes a grinder-doser body enclosing a grinding chamber which houses first and second mills configured and mutually positioned to grind coffee beans into powder. An external ring-nut which is gripped and rotated by an operator integrally connects to the first mill. A nut screw with a longitudinal axis, inside the grinding chamber, is engaged with an external thread of the ring-nut to translate the first mill along the longitudinal axis. The ring-nut includes a ring-nut body and indices defining the angular position thereof. The grinder-doser body includes a fixed reference for the indices. The ring-nut is associated with a graduated ring having the indices, and a cover at least partially removable to lock the graduated ring between the cover and the ring-nut. The cover is fixed to the ring-nut body by a partially removable couple for adjusting and locking the angular position of the graduated ring.

9 Claims, 6 Drawing Sheets

(51) Int. Cl.
*A47J 42/24* (2006.01)
*A47J 42/06* (2006.01)
*A47J 42/10* (2006.01)

(56) References Cited

U.S. PATENT DOCUMENTS

| | | | | |
|---|---|---|---|---|
| 7,273,005 | B2* | 9/2007 | Turi | A47J 31/42 |
| | | | | 99/275 |
| 7,604,191 | B2* | 10/2009 | Pai | A47J 42/08 |
| | | | | 241/169.1 |
| 8,523,094 | B2* | 9/2013 | De' Longhi | A47J 31/42 |
| | | | | 241/30 |
| 9,980,610 | B2* | 5/2018 | Sahli | A47J 42/06 |
| 10,016,093 | B2* | 7/2018 | Mazzer | A47J 42/08 |
| 10,201,248 | B2* | 2/2019 | Bakke | A47J 42/40 |
| 2005/0211806 | A1* | 9/2005 | Ng | A47J 42/06 |
| | | | | 241/169.1 |
| 2010/0011975 | A1 | 1/2010 | Mazzer | |
| 2010/0095852 | A1* | 4/2010 | Remo | A47J 31/3614 |
| | | | | 99/280 |
| 2010/0170971 | A1* | 7/2010 | Doglioni Majer | A47J 42/38 |
| | | | | 241/30 |
| 2010/0198413 | A1* | 8/2010 | De' Longhi | A47J 31/42 |
| | | | | 700/275 |
| 2014/0224910 | A1* | 8/2014 | Sahli | A47J 42/10 |
| | | | | 241/246 |
| 2016/0015214 | A1* | 1/2016 | Lægdsgaard | A47J 42/10 |
| | | | | 241/259 |
| 2016/0192809 | A1* | 7/2016 | Bakke | A47J 42/40 |
| | | | | 241/101.2 |
| 2016/0220067 | A1* | 8/2016 | Teahan | A47J 42/46 |
| 2016/0345778 | A1* | 12/2016 | Oddera | A47J 42/00 |
| 2017/0095121 | A1* | 4/2017 | Carapelli | A47J 42/02 |
| 2018/0110369 | A1* | 4/2018 | Piras | A23F 5/08 |
| 2019/0365155 | A1* | 12/2019 | Mazzer | A47J 42/16 |
| 2020/0000285 | A1* | 1/2020 | Jana | A47J 42/02 |
| 2020/0029739 | A1* | 1/2020 | Van Hoek | G01G 19/22 |
| 2020/0187706 | A1* | 6/2020 | Rossetto | A47J 31/525 |

FOREIGN PATENT DOCUMENTS

DE 20 2014 105 347 U1 11/2014
FR 2 284 302 A1 4/1976

* cited by examiner

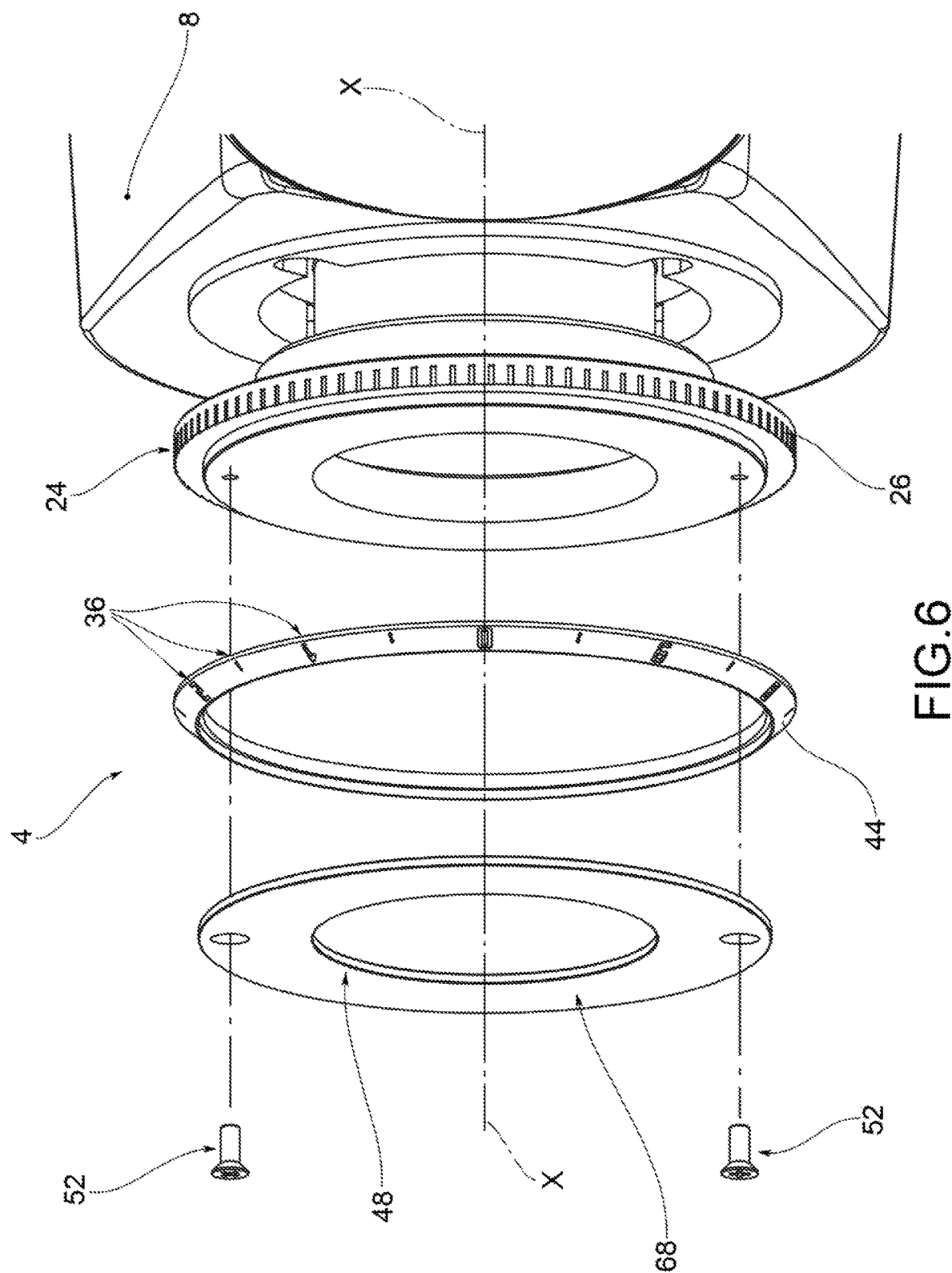

COFFEE GRINDER-DOSER WITH REPOSITIONABLE SYSTEM FOR INDICATING THE POSITION OF THE MEANS FOR ADJUSTING THE DISTANCE BETWEEN THE GRINDERS

This application claims benefit of Ser. No. 102017000118492, filed 19 Oct. 2017 in Italy and which application is incorporated herein by reference. To the extent appropriate, a claim of priority is made to the above disclosed application.

BACKGROUND OF THE INVENTION

The present invention concerns a coffee grinder-doser with repositionable system for indicating the position of the means for adjusting the distance between the grinders.

STATE OF THE ART

As is well known, coffee grinders or grinding groups in machines that dispense coffee beverages comprise a container of coffee beans, connected to a grinding chamber wherein the beans flow and are transformed into ground coffee, and a subsequent system for conveying the ground beans to an infusion or portioning system for the sale of the coffee in a beverage or ground form.

The ground coffee in said grinding chamber is not characterized by particles of uniform geometry but by a distribution of such geometry (particle size distribution) which is highly variable depending both on the distance between the grinding tools through which the coffee bean passes (called mills) and on other factors such as the degree of roasting of the bean, the temperature at which the grinding takes place, the geometry of the mill itself or of the cutting edges thereof, the quality of the cutting edge of the mill, the speed of rotation of the tools, etc., all of which affect the grinding mechanics.

Coffee grinders exist and are well-established wherein the distance between the mills that grind the beans is adjusted by means of a screw/nut screw coupling that puts one of the two mills in position with respect to the other.

The adjustment of the distance between the mills is therefore carried out by means of members that, rotating by means of the screw/nut screw coupling, cause an axial shift (modification of the distance) of one of the two mills.

Once the optimal degree of fineness of the ground coffee has been defined, subsequent adjustments to the relative position between the mills are required in the course of the day or on subsequent days, as there are many aspects that, with the same positioning of the mills, may affect the particle size distribution of the ground coffee (and therefore also the mechanics used to grind the coffee bean), such as, by way of example albeit not an exhaustive one:

the oxidation of the bean determined by the time when the package was opened (inside of which it has been kept in an inert atmosphere), the room temperature or relative degree of humidity (the coffee is hygroscopic), the workload of the grinder (which in turn undergoes heating that is transferred to the coffee that passes through the grinding group within), the wear of the cutting edge of the mill.

Sometimes there are subsequent adjustments towards a greater degree of openness. Sometimes adjustments are made to close the mills to a greater degree.

Normally, adjustments are made for small displacements around a reference point. It is therefore useful to mark said reference point to know the position around which subsequent adjustments should be made.

At other times, there are changes in the system that modify such reference position (such as the use of a different type of coffee, a change of mills, a significant environmental variation).

For this reason, it is also impossible to predict, at the time of sale, the working position around which the coffee grinder will be used.

It would be useful for the user to have a system for repositioning the reference point that defines the optimal distance between the mills to facilitate the use of the coffee grinder.

Some existing solutions for repositioning such index consist of repositionable labels: such solutions, if they use adhesives, are of limited duration. Removable solutions which adhere by a magnetic effect are also known: the limitation of such solutions is that they cannot be applied to adjustment members made of non-ferromagnetic material.

Moreover, such systems may be lost when they are shifted, eliminating the possibility of defining a new reference position.

There are also coffee grinders with a fixed index integral with the movement member of one of the two mills, but these have the drawback that the working position may not be marked at will.

SUMMARY OF THE INVENTION

The need is therefore perceived to resolve the drawbacks and limitations cited with reference to the known art.

DESCRIPTION OF THE DRAWINGS

Further features and advantages of the present invention will become more comprehensible from the following description of the preferred and non-limiting embodiments thereof, wherein:

FIG. 2 shows an exploded view of the grinder-doser of FIG. 1;

FIG. 6 shows a perspective view, in separate parts, of a grinder-doser according to the present invention.

Figure 1:
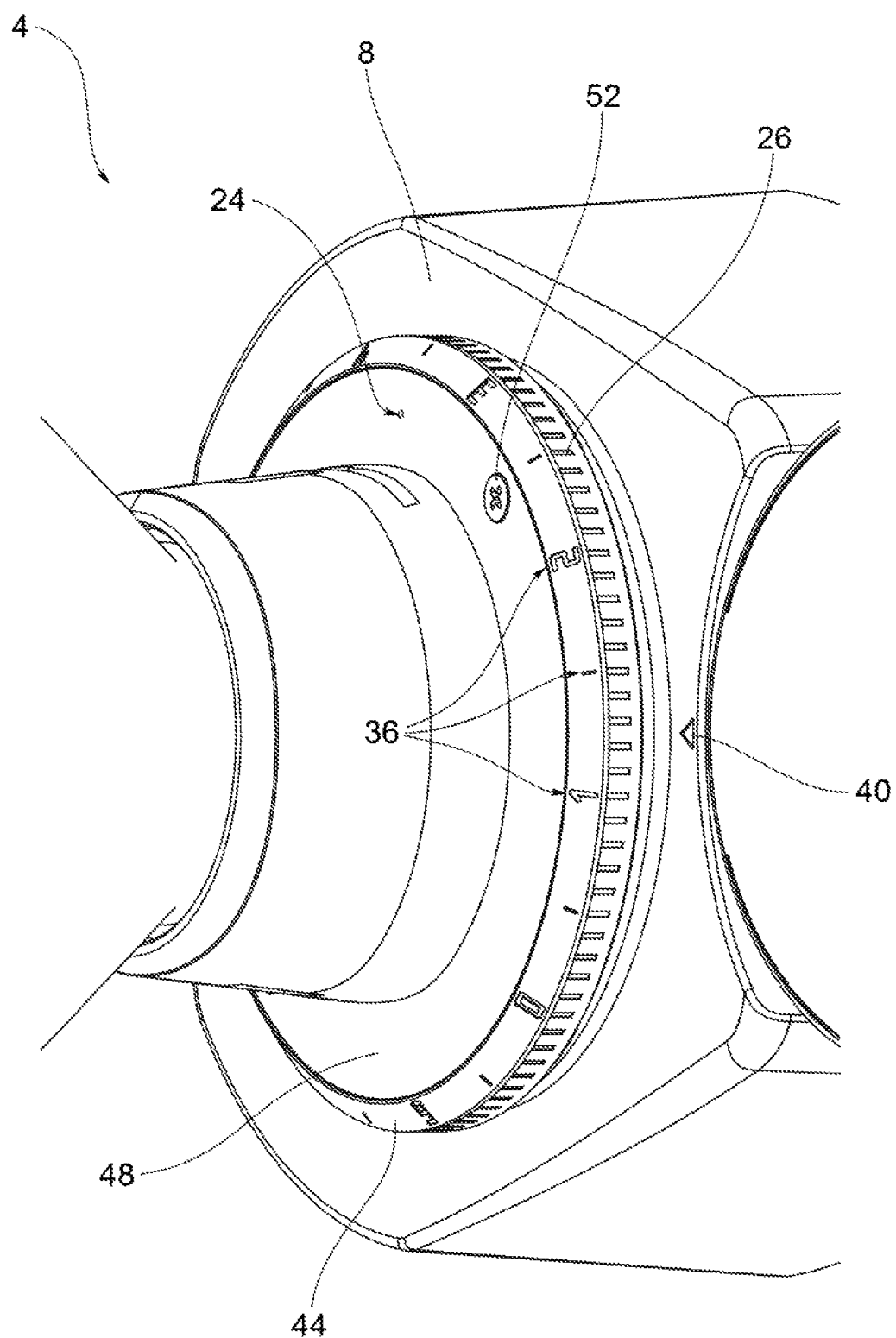
FIGS. 1-2 show perspective views of a grinder-doser according to an embodiment of the present invention, before and after the adjustment of the position index of the mills.

The elements or parts of elements in common between the embodiments described hereinafter will be indicated with the same numerical references.

DETAILED DESCRIPTION

With reference to the aforementioned figures, a total schematic view of a grinder-doser according to the present invention is collectively indicated at 4.

The coffee grinder-doser 4 comprises a grinder-doser body 8 that delimits or encloses a grinding chamber 12 that houses a first mill 18 positioned on a mill holder 16 and a second mill 108 positioned on a mill holder 20, configured and mutually positioned to grind coffee beans into powder.

Each mill 18, 108 and the respective mill holder 16, 20 are integrally joined together and shall be considered as a single body.

The mills 18, 108 comprise teeth 18 for grinding the beans in a known manner.

Obviously, in a known manner, one of said mills 18, 108 is operationally connected to motor means for the rotation thereof with respect to the other mill.

Preferably, the mill, adjustable in position, in this case the first mill 18, is fixed, while the other mill 108, in this case the second mill, is rotated by the motor means.

For the purposes of the present invention, the materials and/or geometry of the mills 18, 108 are not relevant.

The grinder-doser 4 further comprises an external ring-nut 24 to be held and rotated by an operator; said ring-nut 24 is integrally connected to the first mill 18 so as to allow its manual rotation by the user.

To improve the manual grip, the ring-nut 24 may have a knurled pattern (not shown), and/or a lever 28 preferably arranged on the maximum or external diameter 30 thereof.

The mechanical connection between the ring-nut 24 and the first mill 18 may be made in various ways; the important thing is that the ring-nut 24 is integral in movement along the direction of adjustment with the first mill 18, as better described hereinafter.

The ring-nut 24 is further provided with an external thread 33, preferably with a diameter less than its maximum diameter 30.

The coffee grinder 4 further comprises a nut screw with a longitudinal axis X-X inside the grinding chamber 12, which engages with the external thread 33 of the ring-nut 24, to allow the translation of the position of the first mill 18 relative to said longitudinal axis X-X.

In a preferred embodiment, such movement is achieved by means of a known solution such as that described in IT 1082436 wherein a rotation of the ring-nut corresponds to a translation of the first mill along the longitudinal axis X-X.

It should be specified that, for the purposes of the present invention, the orientation of said longitudinal axis is irrelevant: therefore, it may be, for example, either horizontal or vertical.

The ring-nut 24 is fitted with a body 31 and a plurality of indices 36 which define the angular position; for this purpose, the grinder-doser body 8 comprises in turn a reference 40, preferably fixed, for said indices 36.

The ring-nut 24 and the ring-nut body 31 are preferably axial-symmetrical with respect to the longitudinal axis X-X.

The grinding chamber 12 has a preferably cylindrical geometry along the longitudinal axis X-X. The mill holder 16 has an axial-symmetrical geometry with respect to the longitudinal axis X-X and is counter-shaped with respect to the grinding chamber 12 so as to remain guided along the axis X-X therein.

For the purpose of the present invention, the indices 36 may be of any kind, comprising, for example, notches, symbols, numbers and any other element suitable for the purpose. Similarly, the reference 40 may be obtained by means of a symbol, a notch, a dot, an arrow, and so on.

According to one possible variant embodiment, the reference 40 on the grinder-doser body 8 may also be displaceable.

Due to the mechanical connection between the ring-nut 24 and the first mill 18, and between the external thread 33 of the ring-nut 24 and the nut screw 32, the rototranslation of the ring-nut 24 also involves, according to known teachings, the translation of the first mill 18 with respect to the longitudinal axis X-X.

In this way, the distance, and in particular the gap 42 between the teeth of the two mills 18, 108, and therefore the particle size of the ground coffee obtainable from the coffee grinder 4, varies.

Advantageously, the ring-nut 24 is associated with a graduated ring 44, provided with said indices 36, and a cover 48 at least partially removable so as to lock in place the graduated ring 44 between the cover 48 and the ring-nut 24.

The graduated ring 44 and the cover 48 are preferably axial-symmetrical with respect to the longitudinal axis X-X.

In particular, the cover 48 is fixed to the ring-nut body 31 by means of at least partially removable coupling means 52 that allow the adjustment and locking of the angular position of the graduated ring 44.

For example, such coupling means comprise screws or bolts.

According to one possible embodiment, said coupling means 52 comprise captive screws so that there is no risk of them falling or being lost when adjusting the position of the indices 36 on the ring-nut 24.

For example, the cover 48 comprises an undercut 56 which engages on a recess 60 of the graduated ring 44, so as to prevent removal of the graduated ring 44, without first entirely removing the cover 48, as well as the coupling means 52.

According to one embodiment, the graduated ring 44 is coaxial to the ring-nut 24 and has an external diameter equal to the maximum diameter 30 of the ring-nut 24.

Preferably, the cover 48 is inserted in an internal diameter of the graduated ring 44 in order to form a guide for the rotation of the same graduated ring.

According to one embodiment, the coupling means 52 are positioned at a circular crown 68 of the cover 48 inserted inside the graduated ring 44.

According to one possible variant embodiment, on a surface of the ring-nut 24 facing the reference 40, a graduated subdivision 26 is affixed, which is a multiple of the subdivision into indices 36 affixed to the graduated ring 44 for a better identification of the shift of the graduated ring 44 with respect to a reference index.

The method for adjusting a grinder-doser according to the invention shall now be described.

Particularly under conditions of use, the graduated ring 44 is tightened between the ring nut body 31 and the cover 48.

In this way, the position of the graduated ring 44 cannot be adjusted at will with respect to the reference 40: in other words, it is not possible to 'reset to zero', i.e. align the reference 40 with a specific index 36, as a function of a preferred setting.

Such situation is illustrated, for example, in FIG. 1, wherein, when the distance between the mills 18, 108 has been adjusted, the index 36 aligned with the reference 40 is unspecified (roughly approximated as 1.3).

If this adjustment is to be made, the mills 18, 108 must first of all be set to the correct or desired distance from each other according to the particle size of the ground coffee to be obtained.

Thus, after such adjustment, it is useful to align a particular index 36 of the graduated ring to the reference 40.

To this end, one proceeds with the step of loosening the coupling means 52 so as to allow the rotation of the graduated ring 44 with respect to the ring-nut body 31 without rotating the latter, so as not to modify the distance between the mills 18, 108.

For this purpose, it is sufficient to loosen said coupling means 52 slightly, so as to overcome the friction exerted on the graduated ring 44.

As seen, the graduated ring 44 is not removable solely by loosening the coupling means 52.

Thus, the required adjustment is made, aligning a specific index 36 to the reference 40.

Figure 2:
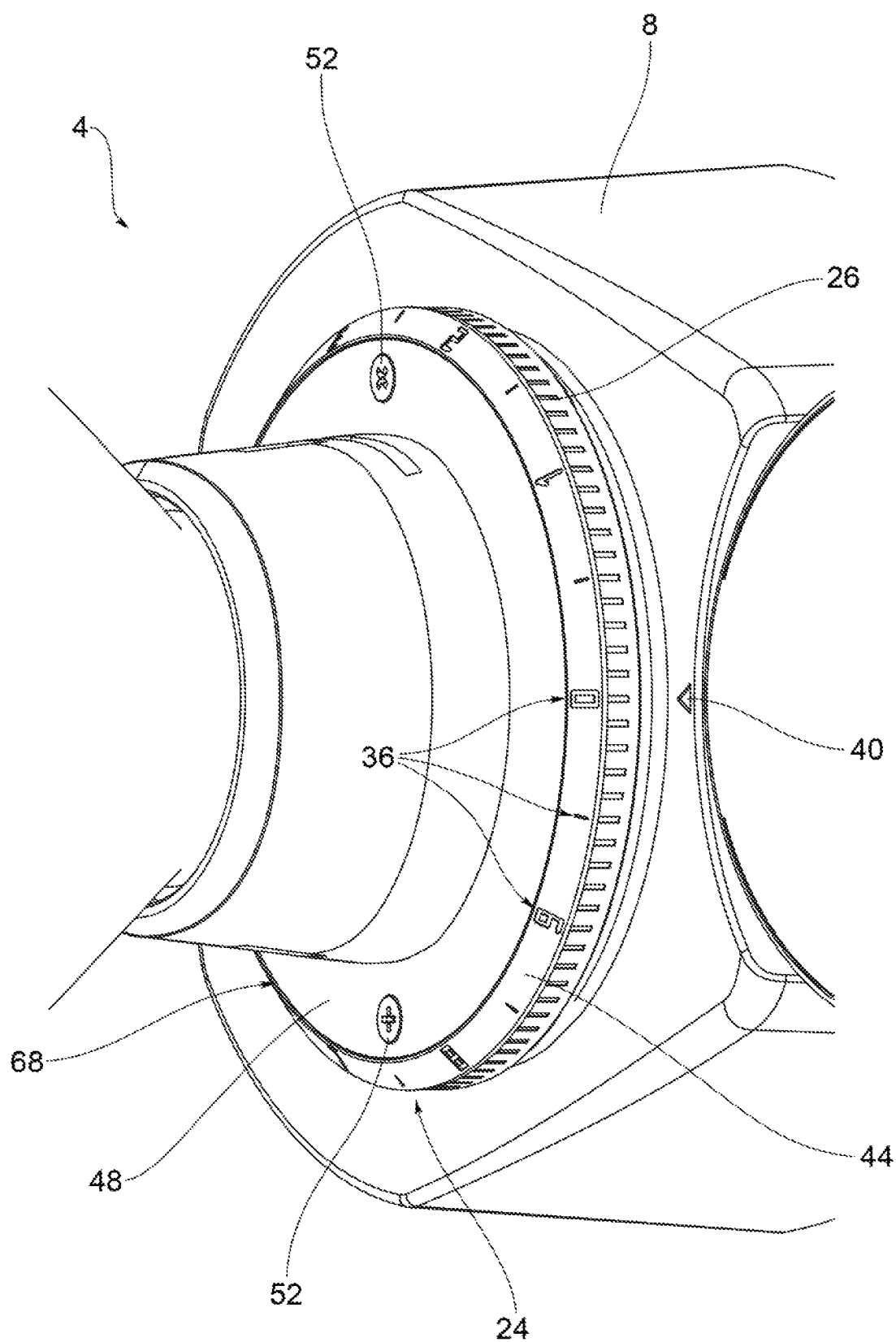
Figure 3:
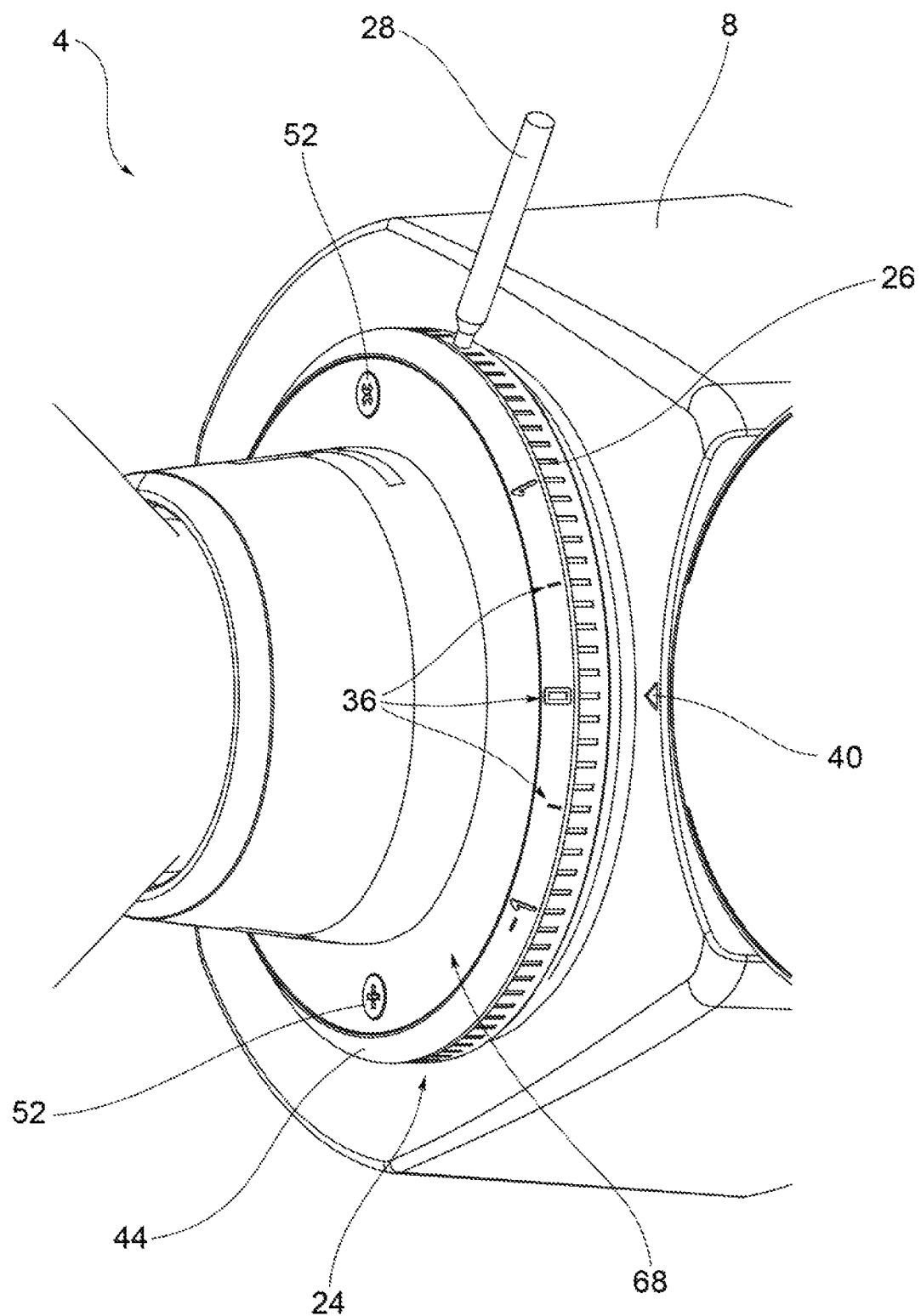
FIG. 3 shows a perspective view of a grinder-doser according to a variant embodiment of the present invention.
Figure 4:
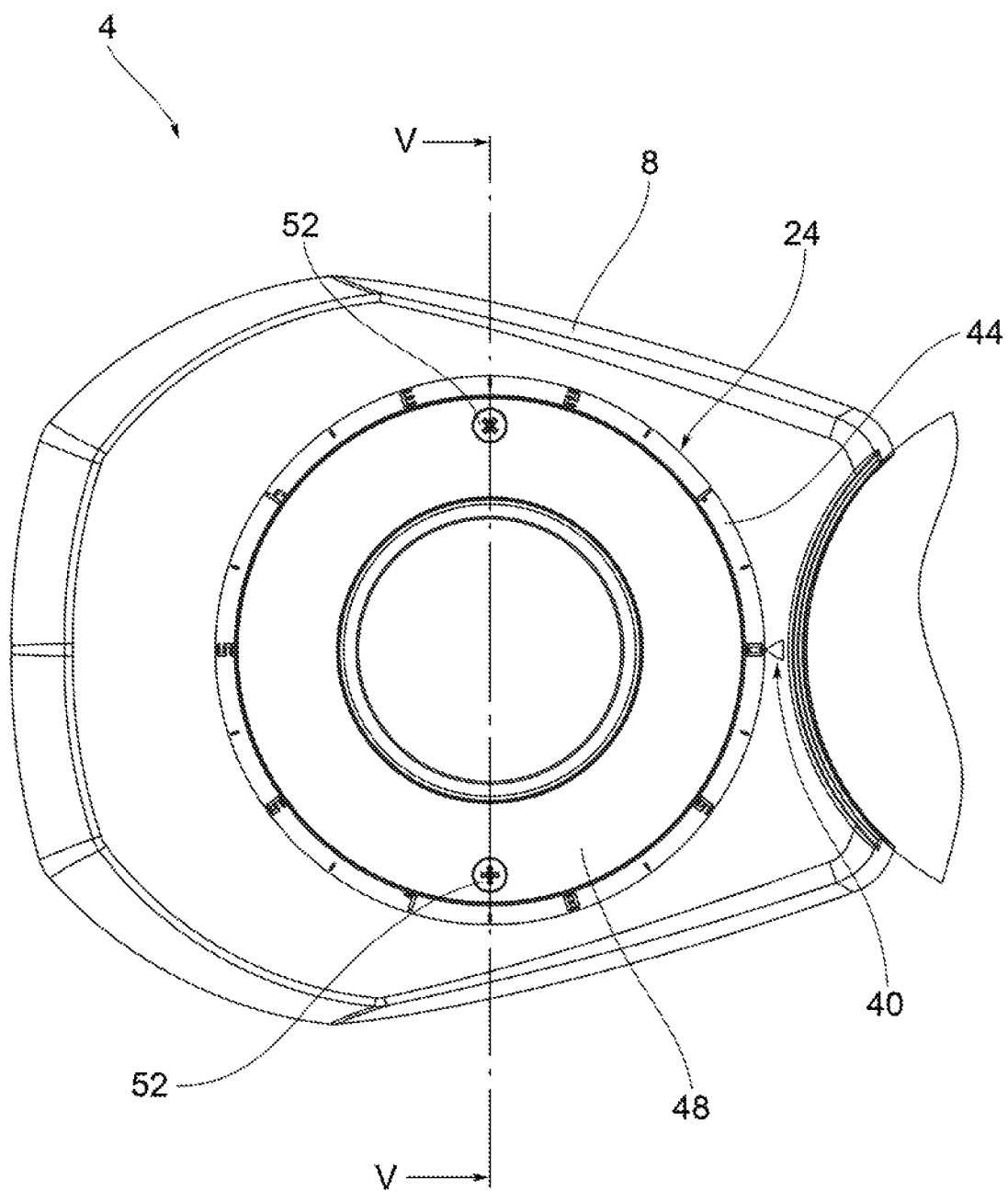
FIG. 4 shows a view along the axis of the mill adjustment of a grinder-doser in accordance with the present invention.
Figure 5:
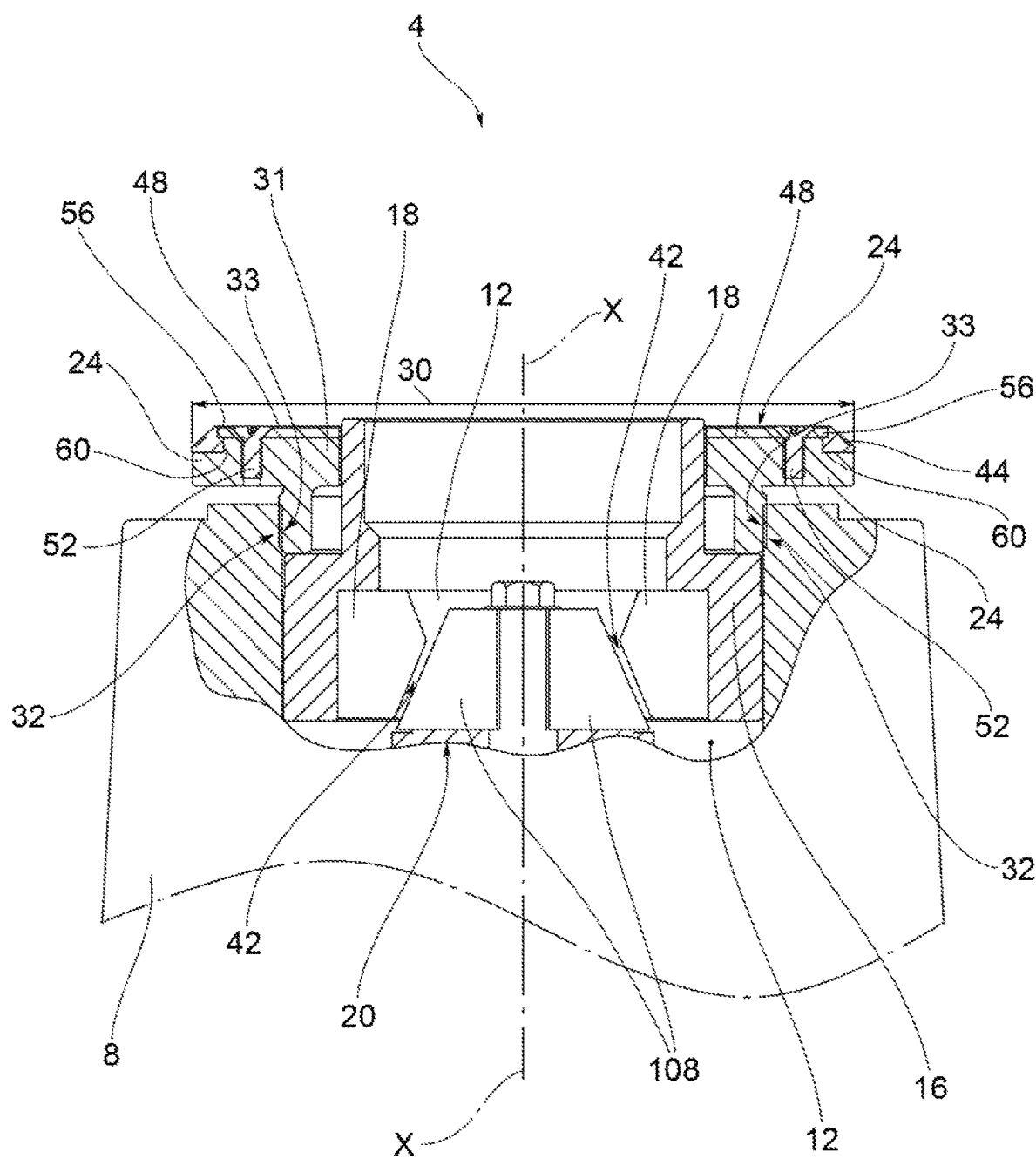
FIG. 5 shows a sectional view of the grinder-doser of FIG. 4, along the sectional plane V-V indicated in FIG. 4.

In the case of FIG. 2, the index 36 corresponding to '0' has been brought into alignment with the reference 40. Obviously, the choice of the index '0' is purely random and absolutely non-binding for the purposes of the present invention.

Finally, the coupling means 52 are tightened again so that the graduated ring 44 and the ring-nut body 31 are again integral with each other.

The operator can thus make small movements around the set adjustment point (distance between the mills 18, 108), moving the ring-nut around the specific index chosen (i.e. the index aligned with the reference 40).

As may be appreciated from the foregoing, the grinder-doser according to the present invention overcomes the disadvantages of the prior art.

In particular, the invention makes it possible to effectively reposition at will the reference of the adjustment means of the distance between the mills in a fast, reliable and lasting manner.

The system is practical and economical and lends itself well to various adjustment changes without losing precision, as is the case with well-known solutions using adhesives.

The mounting system does not allow improper use or accidental removal of the graduated ring.

A person skilled in the art, in the object of satisfying contingent and specific requirements, may make numerous modifications and variations to the grinder-dosers described above, all of which are contained within the scope of the invention as defined by the following claims.

The invention claimed is:

1. A coffee grinder-doser comprising:
   a grinder-doser body, enclosing a grinding chamber housing a first mill and a second mill configured and mutually positioned to grind coffee beans into ground coffee,
   an external ring-nut to be gripped and rotated by an operator, integrally connected to the first mill,
   a nut screw with a longitudinal axis, inside the grinding chamber, which engages with an external thread of the ring-nut, to translate position of the first mill relative to said longitudinal axis,
   the ring-nut being fitted with a ring-nut body and a plurality of indices which identify angular position, the body of the grinder-doser comprising a fixed reference for said indices,
   the ring-nut being associated with a graduated ring, provided with said indices, and an at least partially removable cover to lock in place the graduated ring between the at least partially removable cover and the ring-nut, the at least partially removable cover being attached to the ring-nut body by an at least partially removable coupler which adjusts and locks the angular position of the graduated ring.

2. The coffee grinder-doser according to claim 1, wherein said at least partially removable coupler comprises screws or bolts.

3. The coffee grinder-doser according to claim 1, wherein said at least partially removable coupler comprises captive screws.

4. The coffee grinder-doser according to claim 1, wherein the at least partially removable cover comprises an undercut that engages on a recess of the graduated ring, to prevent removal of the graduated ring without first removing the at least partially removable cover entirely.

5. The coffee grinder-doser according to claim 1, wherein the graduated ring is coaxial to the ring-nut and has an outer diameter equal to a maximum diameter of the ring-nut, wherein the ring-nut has a knurling and/or lever to improve grip.

6. The coffee grinder-doser according to claim 1, wherein the at least partially removable cover is inserted in an inner diameter of the graduated ring to form a guide to rotation of the graduated ring.

7. The coffee grinder-doser according to claim 1, wherein said at least partially removable coupler is positioned at a circular crown of the at least partially removable cover inserted inside the graduated ring.

8. The coffee grinder-doser according to claim 1, wherein on a surface of the ring-nut facing the reference is a graduated subdivision which is a multiple of a subdivision into indices fixed to the graduated ring, for identification of shift of the graduated ring compared to a reference index.

9. The coffee grinder-doser according to claim 1, wherein one of said mills is operatively connected to a motor for rotation with respect to the other mill.

* * * * *